United States Patent [19]
Sights

[11] 3,793,962
[45] Feb. 26, 1974

[54] AMUSEMENT RIDE

[76] Inventor: Robert C. Sights, 5515 Green Forrest Dr., Jacksonville, Fla. 32210

[22] Filed: Dec. 1, 1971

[21] Appl. No.: 203,779

[52] U.S. Cl.................. 104/61, 104/244.1, 191/23, 191/48
[51] Int. Cl............................................ A63g 15/00
[58] Field of Search .... 104/53, 61, 171, 244.1, 245, 104/246, 249; 105/141; 46/216, 17, 18; 191/23, 24, 28, 48

[56] References Cited
UNITED STATES PATENTS

| | | | |
|---|---|---|---|
| 1,124,269 | 1/1915 | Bernheim............................ | 104/171 |
| 3,680,487 | 8/1972 | Cirami................................. | 104/53 |
| 2,068,403 | 1/1937 | Ekstrom.............................. | 104/244.1 |
| 583,109 | 5/1897 | Daniels................................ | 104/61 |
| 2,994,281 | 8/1961 | Price.................................... | 104/61 |
| 1,236,039 | 8/1917 | Baker................................... | 104/61 |
| 3,006,286 | 10/1961 | Bacon.................................. | 104/246 |

*Primary Examiner*—Robert J. Spar
*Assistant Examiner*—D. W. Keen
*Attorney, Agent, or Firm*—Clarence A. O'Brien; Harvey B. Jacobson

[57] ABSTRACT

An amusement ride having a frame, electrically conductive wheels for engaging a track for partially supporting the frame and guiding same about a path of movement, and wheels connected to the frame for moving the frame about the path of movement. The wheels contact a surface on which the track is resting. An electric motor is mounted on the frame for receiving electric power from the track. The track has a longitudinally extending track member defining a substantially circular cross section, a chamber, and a longitudinally extending slot communicating with the chamber. A filler material is arranged in the chamber opposite the slot for providing a flat bed. Wires are mounted on the flat bed and extend with the track member for forming an electrical conductor and rails for the electrically conductive wheels to ride on. A body member is mounted on the frame and arranged for selective cyclical movement toward and away from the frame by a device including a cam and a cam follower mounted on a pivotal lever for selective engagement with the cam.

12 Claims, 9 Drawing Figures

AMUSEMENT RIDE

BACKGROUND OF THE INVENTION

1. Field of Invention

This invention relates to an amusement ride. In particular, this invention relates to an amusement ride suitable for children, especially young children.

2. Description of the Prior Art

There has long been a great demand for amusement rides suitable for children. In particular, there has long been a demand for such amusement rides which can be quickly erected on, for example, a vacant lot for temporary use. Furthermore, since these devices are to be used by children, often very young children, it is necessary that they be so designed that there will not be a possibility of accidental injury to the children.

It is known to provide electricity to a vehicle by running the electrical conductors inside of a track defining a slot in which is arranged a pickup device connected to the vehicle. Such an arrangement is disclosed in, for example, U.S. Pat. No. 2,510,241, issued June 6, 1950 to J. J. Miller. With an arrangement such as that described in this patent, however, the wheels supporting the vehicle must run along a substantially smooth surface defined by the track. This concept is not practical for use as an amusement ride due to the very expensive track that must be provided.

A concept is also known, as disclosed in, for example, U.S. Pat. No. 2,836,129, issued May 27, 1958 to C. O. Jaeger, in which a vehicle is supported by its wheels and guided along a current carrying track. This approach, however, requires a linkage between the pickup and the front wheels of the vehicle for steering purposes. In case of a, for example, collison, this linkage could be seriously damaged.

Finally, it is known to move a body member toward and away from a track. One concept is shown in, for example, U.S. Pat. No. 1,370,385, issued Mar. 1, 1921 to M. Unger. The device described in this patent however, is not selectably operable, as is often desirable for an amusement ride.

SUMMARY OF THE INVENTION

It is an object of the present invention to provide an amusement ride which is suitable for children.

It is a further object of the present invention to provide an amusement ride having selective cyclical movement toward and away from a surface upon which the ride is arranged.

It is yet another object of the present invention to provide a track for an amusement ride which is inexpensive to make and easy to set up.

These and other objects are achieved according to the present invention by providing an amusement ride having a frame, means connected to the frame for engaging a track for partially supporting the frame and guiding same about a path of movement, and means connected to the frame for moving the means for engaging and said frame about the path of movement.

A track according to a preferred embodiment of the present invention defines a path of movement and includes a longitudinally extending track member defining a chamber and a longitudinally extending slot communicating with the chamber. Means are arranged in the chamber and extend with the track member for forming an electrical conductor. In a preferred embodiment, the electrical conductor is a plurality of wires forming rails, and the means for engaging includes a portion extending through the slot and electrically conductive wheels connected to the portion and arranged to ride on the rails. A preferred embodiment of a track according to the present invention defines a substantially circular cross section and has a filler material arranged in the chamber opposite the slot for providing a flat bed for the rails.

In a preferred embodiment of the means for engaging, a torpedo shaped member is connected to the extending portion and mounts the conductive wheels.

In order to arrange one or more track members into a closed path, each track member has two spaced ends, and means are provided for selectively, electrically conductively connecting the ends together to form a closed path.

Means may be provided for stabilizing the track member with respect to the surface on which it is resting.

In a preferred embodiment of the means for moving, a shaft is mounted on the frame for rotation with respect thereto, and a plurality of wheels are mounted on the shaft for rotation therewith and contact the surface on which a track is resting. Means including an electric motor electrically connected to the conductive wheels to receive power from the rails, a pulley mounted on the motor and a pulley mounted on the shaft, and a belt rotatively connecting the pulleys, is provided on the frame for rotating the shaft.

A body member is preferably connected to the frame for pivotal movement with respect thereto, and means are arranged in the housing for selectively cyclically moving the body member toward and away from the frame. This means preferably includes a cam mounted on the shaft of the means for moving for rotation therewith, and a follower member connected to the body member and selectively engageable with the cam. The selective engagement is preferably achieved by providing a lever pivotally connected to the body member and mounting the follower member, and means connected to the lever and extending outside of the body member for selectively pivoting the lever and selectively engage the follower member with the cam.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
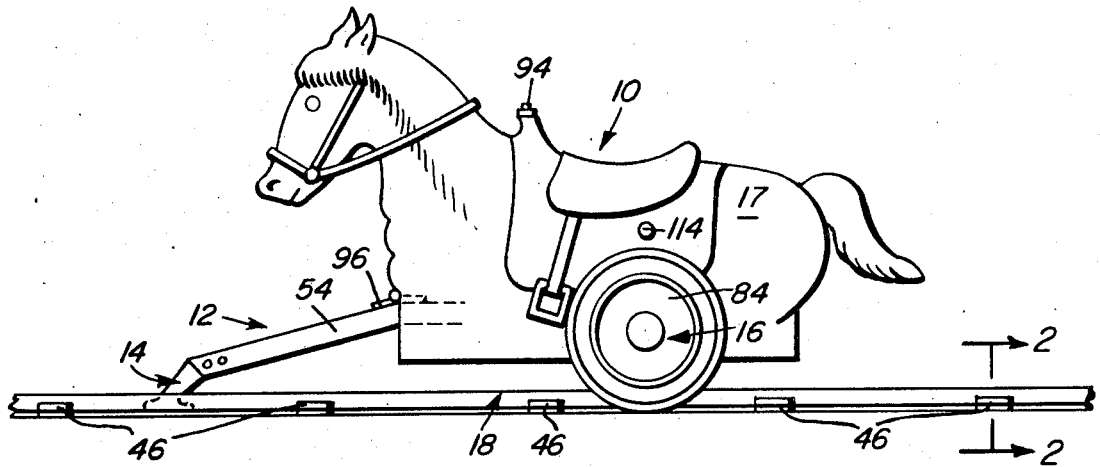
FIG. 1 is a vertical longitudinal view showing an amusement ride according to the present invention.

FIG. 1 of the drawings shows an amusement ride 10 according to the present invention. Amusement ride 10 has a frame 12 having track engaging means 14 for partially supporting frame 12 and guiding same about a path of movement, a motion means 16 for moving frame 12 and track engaging means 14 about the path of movement, and a body member 17 connected to frame 12. Although body member 17 is represented in FIG. 1 as a horse, it is to be understood that the configuration of body member 17 may vary within the scope of the present invention. Track engaging means 14, which partially supports frame 12, engages a track 18 for guiding frame 12 about a path of movement defined by track 18.

Figure 3:
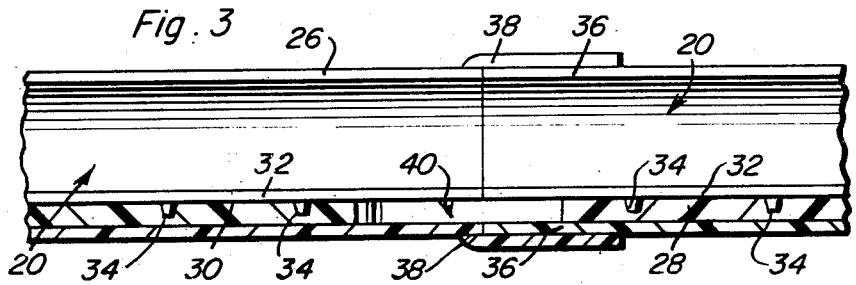
FIG. 3 is a vertical longitudinal sectional view of a track according to the present invention.
Figure 2:
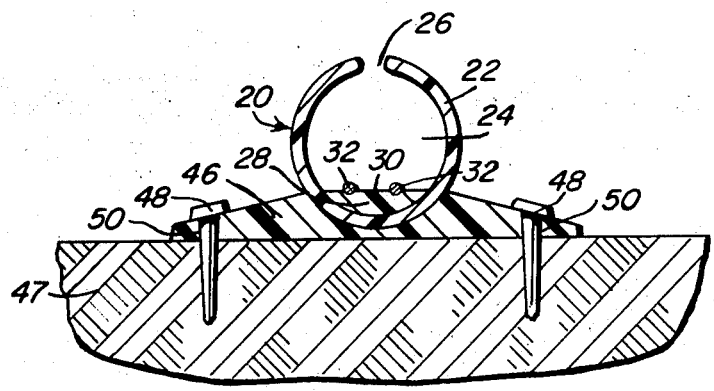
FIG. 2 is a sectional view taken generally along the line 2—2 of FIG. 1.

As can be seen from FIG. 2, track 18 is made up from at least one longitudinally extending track member 20 defining a substantially circular cross section 22, a chamber 24, and a longitudinally extending slot 26 communicating with chamber 24. A filler material 28 is arranged in chamber 24 opposite slot 26 for providing a flat bed 30. A plurality — for example, two — of copper wires 32 are mounted on flat bed 30 as by prongs 34 (FIG. 3), and extend with track member 20 for forming an electrical conductor. Other suitable known electrically conducting materials than copper may be used if desired. Track member 20 and filler material 28 may be constructed in a known manner from, for example, a suitable, known synthetic material. Filler material 28 should adhere to track member 20.

A plurality of track members 20 may be advantageously used, depending on the layout of track 18. Each track member 20 has a plain, or straight end 36 (FIG. 3) and a spaced enlarged end 38 for fitting over end 36.

Figure 4:
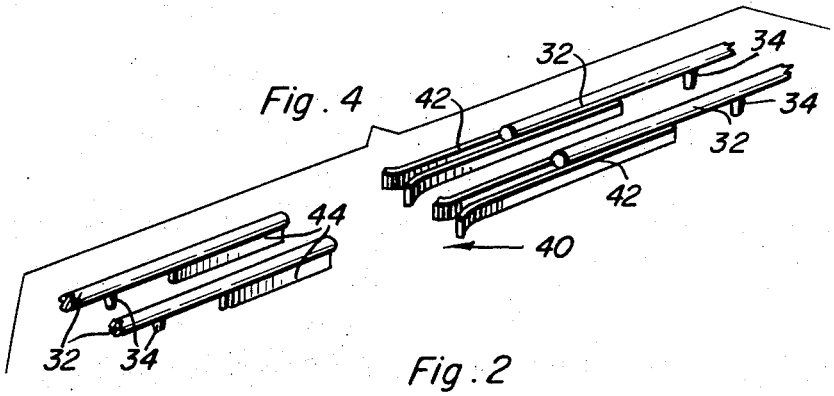
FIG. 4 is an exploded perspective view showing a detail of rails according to the present invention.

A connector 40 having a portion 42 (FIG. 4) and a mating portion 44 is provided for electrically connecting copper wires 32. Portions 42, 44 may be constructed from, for example, copper, and be, for example, soldered to wires 32.

Ends 36, 38, and connector 40 form a means for selectively, electrically conductively connecting the ends of one or a plurality of track members 20 together to form a closed path.

A plurality of saddle supports 46 (FIG. 2) may be spaced along track member 20 for stabilizing same with respect to the surface 47 on which member 20 is resting. It is particularly important that slot 26 be maintained upright. Supports 46 may be anchored to, for example, the ground by pins 48, which may be wooden pegs or steel spikes, passing through holes 50 defined in supports 46. Supports 46 may be constructed from, for example, a suitable, known synthetic material.

Figure 5:
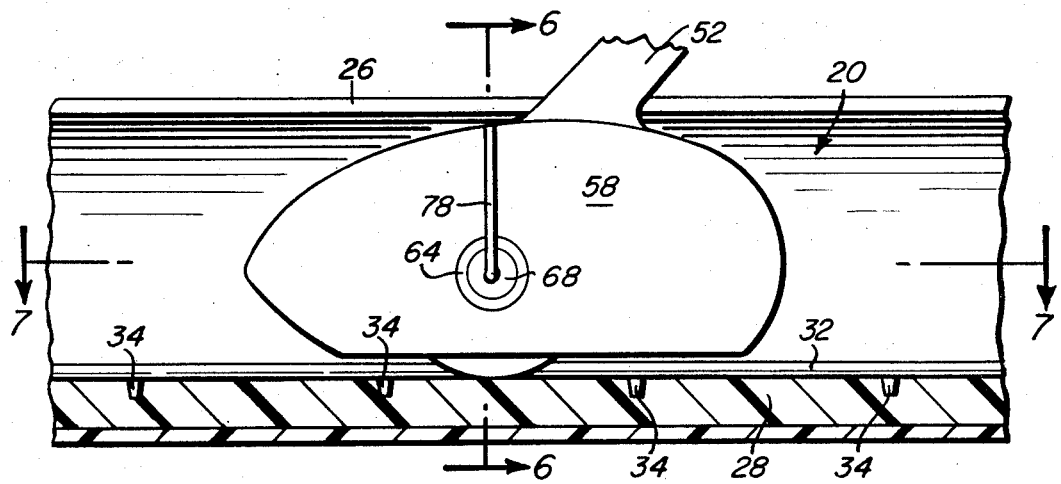
FIG. 5 is a vertical longitudinal sectional view of a track according to the present invention, drawn to a larger scale than FIG. 3, and showing a pickup device according to the present invention arranged therein.
Figure 7:
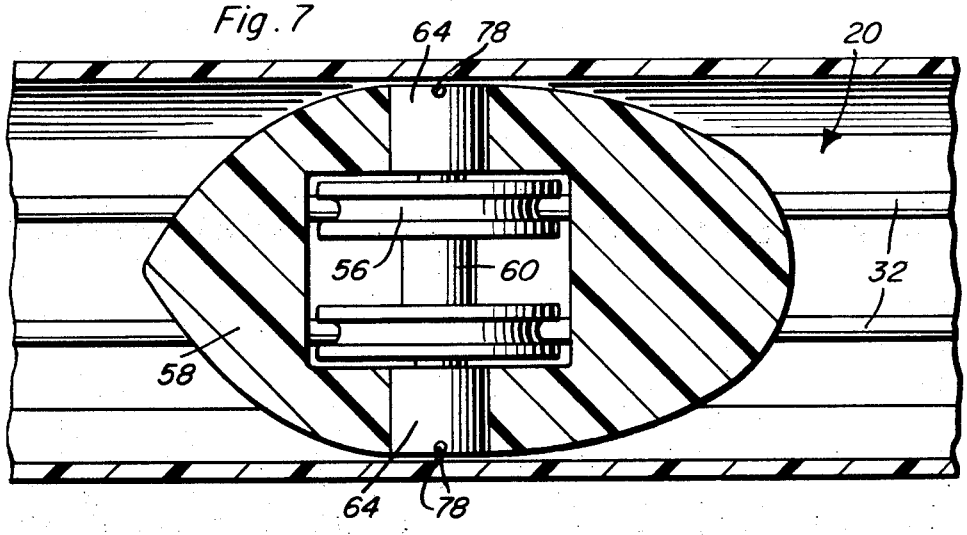
FIG. 7 is a sectional view taken generally along the line 7—7 of FIG. 5.
Figure 6:
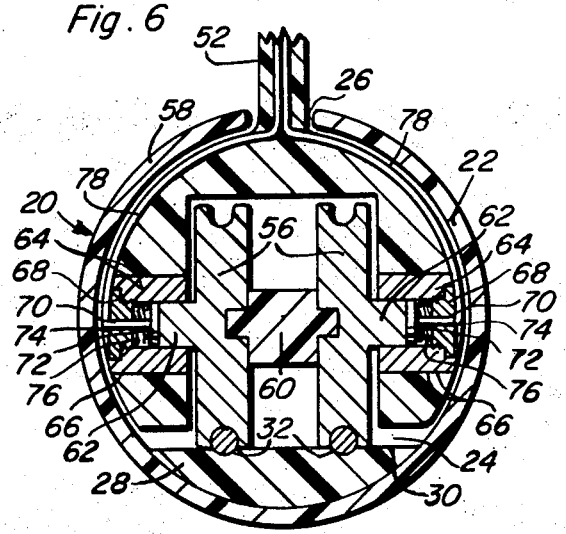
FIG. 6 is a sectional view taken generally along the line 6—6 of FIG. 5.

Referring now to FIGS. 5–7, track engaging means 14 has a portion 52 extending through slot 26 and connected to a tongue 54 of frame 12 as by, for example, screw fasteners, and a plurality — for example, two — electrically conductive wheels 56 are connected to portion 52 and arranged to ride on the rails formed by wires 32. Wheels 56 may be constructed in a known manner from, for example, copper. Although another number of wheels 52 and wires 32 may be used, such as three, a two-rail system is preferable. A, for example, torpedo shaped member 58 is connected to, and preferably integral with portion 52, and mount wheels 56. Portion 52 and member 58 may be constructed from, for example, a suitable, known synthetic insulating material, as may be a spacer 16 arranged between wheels 56.

Each wheel 56 has an electrically conductive portion 62 which may be integral as shown in FIG. 6. A bearing 64 is provided for each portion 62, and is fitted in an opening 66 defined by member 58. An electrically conductive plug 68 is connected to bearing 64 as by screw threads, and has a rod 70 of a contact member 72 passing through a bore 74 defined therein. A spring 76, such as a coiled compression spring, biases contact member 72 against axle portion 62. A wire 78, preferably insulated, is electrically connected to rod 70, and passes through slot 26 and to frame 12.

Figure 8:
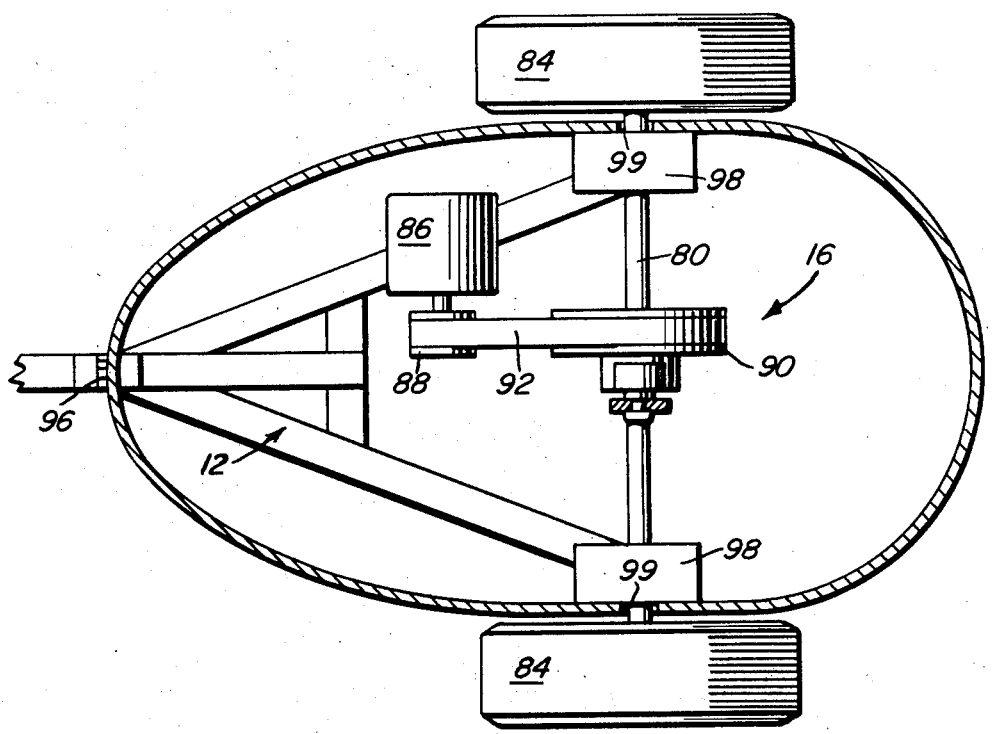
FIG. 8 is a fragmentary horizontal longitudinal view, partly in section, of an amusement ride according to the present invention.
Figure 9:
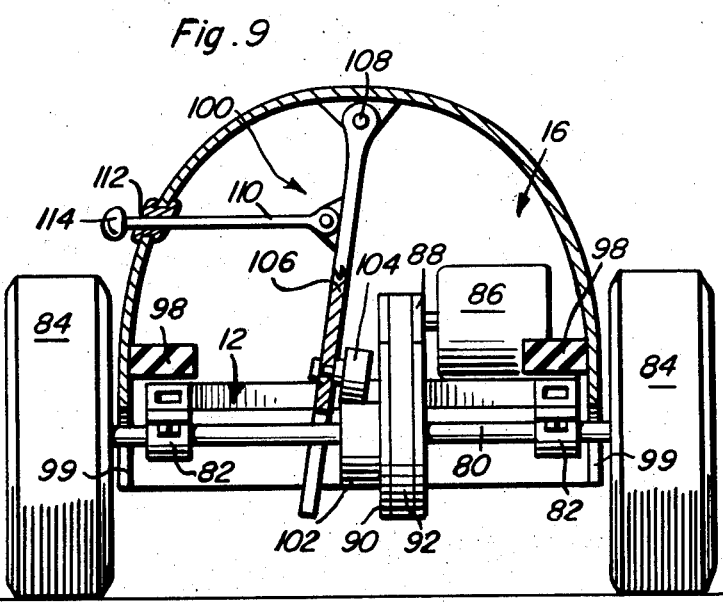
FIG. 9 is a vertical end sectional view, partly cut away, of the amusement ride of FIG. 8.

A preferred embodiment of means 16 is shown in FIGS. 8 and 9. A shaft 80 is mounted on frame 12 by suitable, known bearings 82 for rotation with respect thereto. A plurality of wheels 84 are mounted on shaft 80 in a known manner for rotation therewith, and contact the surface on which track 18 is resting. A pair of, for example, rubber tires are shown in FIGS. 8 and 9. A suitable, known electric motor 86 is mounted on frame 12 and is electrically connected to wheel 56 by means of wires 78 (not shown in FIG. 8). A pulley 88 is mounted on electric motor 86, and a pulley 90 on shaft 80. A belt 92 rotatably connects pulleys 88, 90. Pulleys 88, 90 and belt 92 may be, for example, standard V-pulleys and belt, respectively. Electric motor 86, pulleys 88, 90, and belt 92 together from a means for rotating shaft 80. A suitable, known switch 94 (FIG. 1) is preferably inserted in one wire 78 for starting and stopping motor 86.

Body member 17 is pivotally connected to frame 12 by, for example, a suitable, known hinge 96 (FIGS. 1 and 8). Hinge 96 may be, for example, a leaf-and-pin hinge. Stop blocks 98 are mounted in body member 17 for engaging with frame 12 and limiting the downward movement of body member 17. Blocks 98 are preferably constructed from a suitable, known resilient material for providing a cushioning effect. Slots 99 are defined in body member 17 for permitting movement relative to shaft 80.

A means 100 (FIG. 9) is arranged in body member 17 for selectively cyclically moving body member 17 toward and away from frame 12 and track 18. Means 100 has a cam 102 mounted on shaft 80 for rotation therewith, and a follower member 104 connected to body member 17 and selectively engageable with cam 102. A lever 106 is pivotally connected to body member 17 at point 108. Follower member 104 is mounted on lever 106 in a known manner for rotation with respect thereto. A rod 110 is pivotally connected to lever 106, and extends outside body member 17 through an opening 112 defined therein for selectively pivoting lever 106 and selectively engage follower member 104 with cam 102. A knob 114 may be attached to rod 110 for facilitating manipulation of rod 110.

When amusement ride 10 is arranged on track 18 as shown in FIG. 1, a, for example, child may mount body member 17, move switch 94 to the closed position, and be guided about track 18 by track engaging means 14 and means 16. By moving knob 114 towards body member 17, body member 17 will move toward and away from the surface 47. Moving knob 114 away from body member 17 stops this movement.

Power may be supplied wires 32 by a, for example, line cord to a, for example, 110 volt source. Motor 86 may be a 110 volt a.c. motor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An amusement ride comprising, in combination:
   a. a frame;
   b. means connected to said frame for engaging a track for partially supporting said frame and guiding same about a path of movement;
   c. means connected to said frame for moving the means for engaging and said frame about the path of movement; and
   d. a body member connected to said frame for pivotal movement with respect thereto, and means arranged in said body member for selectively cyclically moving said body member toward and away from said frame, the means for moving including a rotatable shaft mounted in said body member, and the means for cyclically moving including a cam mounted on said shaft for rotation therewith, a follower member connected to said body member and selectively engageable with said cam, and a lever pivotally connected to said body member, said follower member mounted on said lever, and means connected to said lever and extending outside of said body member for selectively pivoting said lever and selectively engaging said follower member with said cam.

2. An amusement ride as defined in claim 1, further including a track defining a path of movement and including a longitudinally extending track member defining a chamber and a longitudinally extending slot communicating with said chamber.

3. An amusement ride as defined in claim 2, wherein means are arranged in said chamber and extend with said track member for forming an electrical conductor.

4. An amusement ride as defined in claim 3, wherein the means for forming an electrical conductor includes a plurality of wires forming rails, and said means for engaging includes a portion connected to said frame and extending through said slot and electrically conductive wheels connected to said portion and arranged to ride on said rails.

5. An amusement ride as defined in claim 4, wherein said track member defines a substantially circular cross-section, and a filler material is arranged in said chamber opposite said slot for providing a flat bed for said rails.

6. An amusement ride as defined in claim 4, wherein said means for engaging further includes a torpedo shaped member connected to said portion and mounting said conductive wheels.

7. An amusement ride as defined in claim 1, wherein the means for moving includes a shaft mounted on said frame for rotation with respect thereto, means arranged on said frame for rotating said shaft, and a plurality of wheels mounted on said shaft for rotation therewith and contacting the surface on which said track is resting.

8. An amusement ride as defined in claim 7, wherein the wheels are conductive and the means for rotating said shaft includes an electric motor electrically connected to the wheels to receive power from said rails, a pulley mounted on said motor and a pulley mounted on said shaft, and a belt rotatably connecting the pulleys.

9. An amusement ride as defined in claim 1, wherein the means for moving contacts a surface on which the track is resting.

10. An amusement ride comprising, in combination:
    a. a frame;
    b. a track arranged resting on a surface and defining a path of movement;
    c. means connected to and arranged partially supporting the frame and engaging the track for guiding the frame about the path of movement;
    d. motion means connected to the frame at a point spaced from the guiding means along the path of movement and arranged contacting the surface on which the track is resting for supporting the frame in cooperation with the guiding means and moving the frame about the path of movement; and
    e. a body member connected to said frame at a point between the guiding and motion means for pivotal movement with respect to the frame, and wherein means are arranged in said body member for selectively cyclically pivoting said body member with respect to said frame.

11. An amusement ride as defined in claim 10 wherein the means for moving includes a rotatable shaft mounted in said body member, and the means for cyclically moving includes a cam mounted on said shaft for rotation therewith, a lever pivotally connected to the body member, and a follower member mounted on the lever and selectively engageable with said cam.

12. An amusement ride as defined in claim 10, wherein the means for guiding includes electrically conductive wheels arranged to ride on electrically conductive rails of the track, and the means for moving receives electric power from said conductive wheels.

* * * * *